July 29, 1930.   S. I. FEKETE ET AL   1,771,886
INTAKE MANIFOLD FOR INTERNAL COMBUSTION ENGINES
Filed March 16, 1925
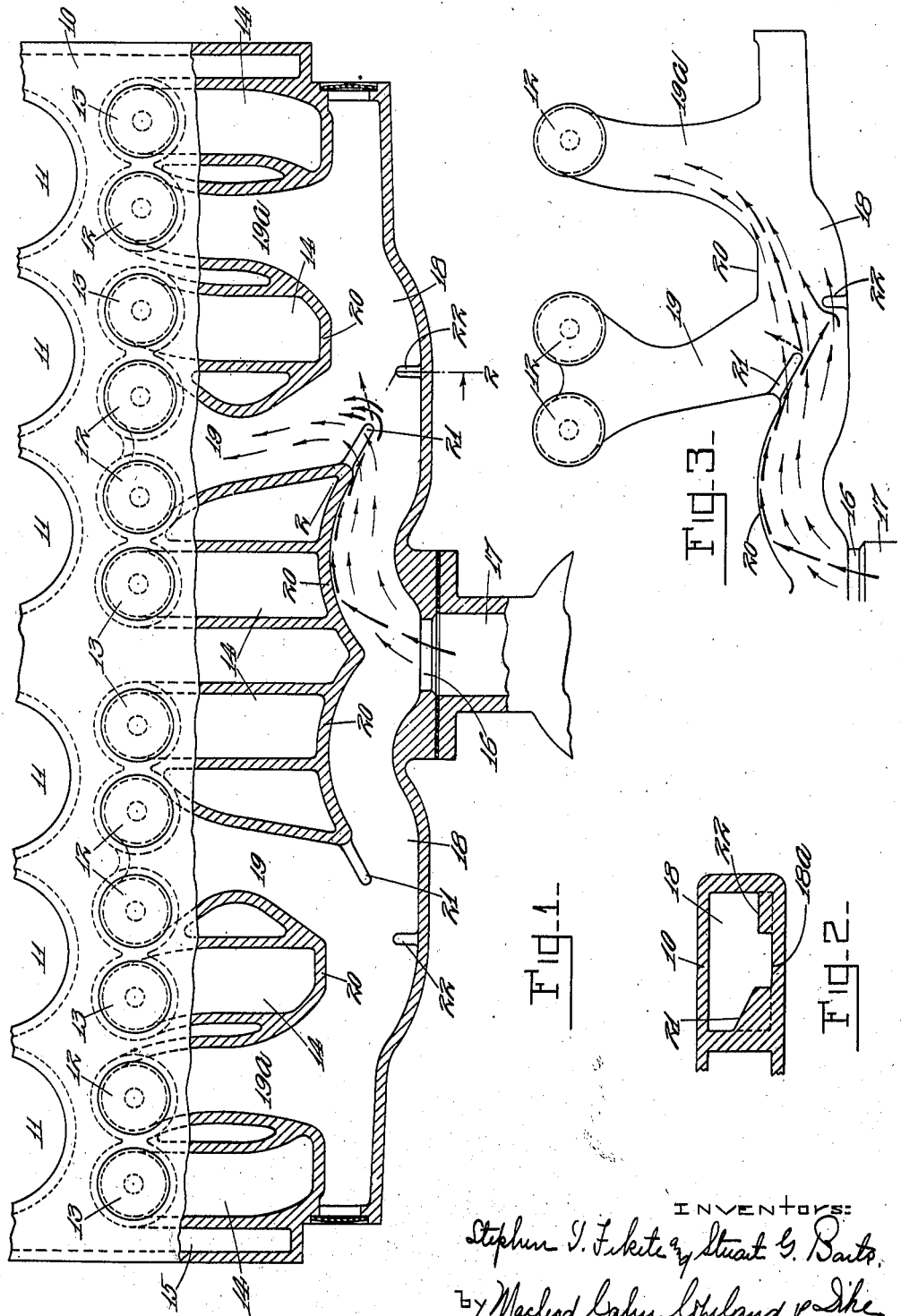
INVENTORS:
Stephen I. Fekete & Stuart G. Baits
by Macleod, Calhoun, Copeland & Dike
Attys.

Patented July 29, 1930

1,771,886

UNITED STATES PATENT OFFICE

STEPHEN I. FEKETE AND STUART G. BAITS, OF DETROIT, MICHIGAN, ASSIGNORS TO HUDSON MOTOR CAR COMPANY, OF DETROIT, MICHIGAN, A CORPORATION OF MICHIGAN

INTAKE MANIFOLD FOR INTERNAL-COMBUSTION ENGINES

Application filed March 16, 1925. Serial No. 15,780.

This invention relates to intake manifolds for internal combustion engines and has for its objects to insure the distribution of all of the fuel reaching the manifold, whether in a wet or dry state, in equal proportions to the combustion chambers of the several cylinders irrespective of temperature and engine speed, and to accomplish this result by means of a simple, compact structure which may, if desired, be formed as an integral part of the engine block.

The foregoing and other objects of the invention, together with means whereby the latter may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise embodied without departure from the spirit and scope thereof.

In said drawings:

Fig. 1 is a horizontal section of a portion of an engine cylinder block embodying the invention illustrating the flow of the combustible mixture to an intermediate cylinder of the block.

Fig. 2 is a detail section taken substantially on the line 2—2, Fig. 1.

Fig. 3 is a fragmentary diagrammatic view illustrating the flow of the combustible mixture to an end cylinder of the block.

While the invention may be otherwise employed, it is herein shown as embodied in an engine block of the type having an intake manifold cast integral therewith.

10 denotes the engine block having a plurality of cylinders 11 controlled by inlet valves 12 and exhaust valves 13. 14 denotes the exhaust passages leading from the exhaust valves 13, said passages, together with the cylinders 11, being surrounded by a suitable water jacket space 15. The intake manifold is provided with an inlet opening 16 disposed substantially midway of its length and communicating with a pipe or conduit 17 leading from the carbureter, said intake manifold comprising a main passage 18 having a substantially flat floor 18$^a$ and extending in opposite directions from the inlet opening 16, and a plurality of branch passages 19 and 19$^a$ leading from said main passage intermediate its ends to the several inlet valves 12 of the intermediate and end cylinders, respectively. Opposite the inlet opening 16, the main passage 18 is preferably curved to form two diverging sections shaped, as shown in Fig. 1, to direct the inflowing mixture to the branch passages at the right or left in accordance with the sequence of the suction strokes of the pistons in the several cylinders, and the exhaust passages 14 are extended into proximity to the inner wall of the passage 18 at points 20 substantially opposite the inlet opening and between the several branch passages, respectively, to provide hot spots at these points.

The branch passages 19, which are nearer to the entrance 16 than the branch passages 19$^a$, are disposed at an acute angle to the main passage 18 in the direction of flow of the mixture, while the branch passages 19$^a$, which are further from the entrance, are disposed at an obtuse angle to said main passage. At the apex of the angle between the main passage 18 and each of the branch passages 19 is a deflector in the form of a projection or baffle 21 extending in the general direction of the apex of the angle, said projection rising from the floor 18$^a$ for a part only of the height of the passage and extending only part way across the latter to a point about midway thereof. A second projection or baffle 22 of approximately the same height as the projection or baffle 21 extends inwardly from the opposite or outer side of the main passage 18 between the branch passages 19 and 19$^a$.

The arrows on Fig. 1 indicate the direction of flow of the mixture when the piston in one of the cylinders fed by a branch passage 19 is on its suction stroke, the path of the gaseous portion of the mixture, comprising air and vaporized fuel, being indicated by the light arrows, and the path of the unvaporized fuel being indicated by the heavy arrows. The fixed gas or mixture of vaporized fuel and air entering the inlet opening 16 passes to the right, as shown in the figure in question, and, for the most part, flows over the projection or baffle 21 to the branch passage 19 and thence to the proper inlet valve 12 and cylinder 11. The unvaporized fuel is caused to strike one or the other of the hot spots 20 substantially opposite the inlet 15, where it may be wholly or partly vaporized, the unvaporized residue passing along the inner curved wall of the passage 18 and along the inner side of the projection or baffle 21 until the end of the latter is reached. At this point a strong current or draft of gaseous fluid passing about the abrupt corner formed by said projection or baffle causes the unvaporized liquid to be blown from said corner and drawn into the branch passage 19 from which it passes to the cylinder. The direction of the draft or current last referred to is such as to prevent further travel of the unvaporized liquid toward the outer end of the manifold, causing said liquid to be carried with the current into the branch passage and cylinder as described.

When the piston in an outer cylinder is on its suction stroke, the operation is as illustrated in Fig. 3. At this time the major part of the gaseous portion of the mixture passes along the main passage 18 over the projections or baffles 21 and 22 and between the latter into the branch passage 19$^a$. The unvaporized liquid passes along the bottom of the passage 18 adjacent the inner wall thereof, as in the first instance, eventually reaching the end of the projection or baffle 21. There being at this time no current tending to draw the liquid into the branch passage 19, the particles of liquid tend to continue their travel beyond the end of the baffle 21 from which they are blown by the current of gaseous fluid past the hot spot 20 intermediate the branch passages 19 and 19$^a$ and into the latter passage. Any liquid particles which are not so caught up will strike the projection or baffle 22 from the end of which they will in like manner be drawn into the main stream of gaseous fluid and carried into the branch passage 19$^a$.

In intake manifolds as heretofore usually constructed, the path followed by the unvaporized liquid fuel depends upon the temperature and engine speed. At low temperatures and speeds, the liquid tends to flow along the bottom of the manifold and thus, to a certain extent, to creep past the intermediate passages with the result that the cylinders fed by the end passages receive more than their proportionate share, and there is also a tendency for the liquid fuel to accumulate in the ends of the manifold. Normally, and when the engine has heated up and is running at relatively high speed, the unvaporized liquid tends to hug the inner wall of the manifold, as above mentioned, and to enter the first branch passage encountered, so that the intermediate cylinders receive more than their proportionate share thereof. Accordingly, if the carbureter be adjusted to supply a suitable mixture for the end cylinders when the engine is cold or running at low speed, or for the intermediate cylinders when the engine is hot or running at high speed, it will be too lean for the intermediate cylinders under the former conditions and for the end cylinders under the latter with resultant loss of power. On the other hand, if the carbureter be adjusted to supply a richer mixture, said mixture will be too rich for the end cylinders at low temperatures and speeds and for the intermediate cylinders at high temperatures and speeds, with resultant carbonization. Attempts have been made to overcome these difficulties, and to increase the efficiency and mileage while reducing carbonization, by the use of so-called "rams-horn" manifolds of elaborate and cumbersome design. The present invention accomplishes the same result in an even more effective way in a manifold so simple and compact that it may be cast as an integral part of the cylinder block. It will be seen that, when the piston in an intermediate cylinder is on its suction stroke, any unvaporized fuel travelling along the passage 18 will be deflected by the baffle 21 toward the baffle 22 which will arrest the further travel in this direction of any particles which may reach it, said particles being, however, for the most part caught up by the gaseous current and blown from the end or edge of the baffle 21 into the branch passage 19. When the piston in an end cylinder is on its suction stroke, the liquid particles are prevented by the baffle 21 from entering the branch passage 19 immediately, and upon reaching the end of said baffle are, for the most part, blown therefrom into the branch passage 19$^a$, such as may not be so caught up being arrested by the baffle 22 and blown from the end of the latter in like manner into said passage. In any event, in order to reach a branch passage other than that for which they are destined, it would be necessary for the heavy or liquid particles, upon leaving an abrupt corner or edge of the wall along which they have been travelling, to continue their travel across a stream of rapidly moving gaseous fluid (as indicated by the heavy dotted arrows on Figs. 1 and 3) about midway of which stream said corner or edge is located, something which it is impossible for them to do. On the contrary, said particles are blown by the gaseous current from said corner or edge, which forms a take-off therefor, and are carried along by said current into the proper branch passage with a force which effectually prevents their improper distribution. This result is accomplished in part by the acute angular position of the branch passages 19 with respect to the main passage 18 and in part by the projections or baffles 21 and 22 which, while accomplishing the desired result, do not objectionably obstruct the flow of the gaseous portion of the mixture.

It will be noted that, in entering either of the branch passages 19 and 19ª, the liquid particles are carried or thrown by the baffles 21 and 22 into proximity to a hot spot 20 between said passages, thereby further tending to vaporize said particles.

It will also be observed that, in the construction shown, there is formed at the junction of the main passage 18 and branch passage 19 an enlarged chamber of greater cross section than said passages and in which the baffles 21 and 22 are located. By reason of this enlargement the velocity of the stream entering the same is decreased, thereby increasing the tendency of the unvaporized particles to collect at the bottom where they are acted upon by said baffles.

Having thus described our invention, we claim:

1. In an intake manifold for internal combustion engines, a passage having a substantially flat horizontal floor, and a projection extending part way only across said passage and upwardly from the floor for a part of the height of the passage in the line of movement of the heavy particles of fuel in the lower part of the manifold to divert said particles while permitting free movement of the mixture in the upper part of the passage.

2. An intake manifold for internal combustion engines, having branches leading to inlet valves, one of said branches being at an acute angle to the main passage and another which is further from the entrance being at an obtuse angle to the main passage, there being at the apex of the angle between the main passage and the first branch a projection in the lower part of the main passage directing the heavy unvaporized particles in a direction different to that taken by the fixed gas.

3. An intake manifold for internal combustion engines, having branches leading to inlet valves, one of said branches being at an acute angle to the main passage, and another which is further from the entrance being at an obtuse angle to the main passage, there being at the opposite side of said main passage between said branch passages a projection in the lower part of the main passage directing the heavy unvaporized particles in a direction different to that taken by the fixed gas.

4. An intake manifold for internal combustion engines, having branches leading to inlet valves, one of said branches being at an acute angle to the main passage, and another which is further from the entrance being at an obtuse angle to the main passage, there being at the apex of the angle between the main passage and the first branch and at the opposite side of the main passage between said branch passages projections in the lower part of the main passage directing the heavy unvaporized particles in a direction different to that taken by the fixed gas.

5. An intake manifold for internal combustion engines, said manifold having a main passage and a branch leading therefrom, a projection in the lower part of the passage only, said projection extending from the wall at the junction of the main passage and the branch passage part way across said passages and serving to direct the heavy particles in a direction different to that taken by the fixed gas which enters the branch.

6. An intake manifold for internal combustion engines having a main passage, branch passages leading therefrom, a hot spot intermediate said branch passages, and baffles for directing the unvaporized portions of a charge passing through said manifold into proximity to said hot spot during their passage to either of said branch passages.

7. A horizontally disposed intake manifold for internal combustion engines having a main passage for combustible mixture, a branch passage, and a baffle in the lower part only of said main passage and from the end of which the unvaporized portion of said mixture is blown by the gaseous portion thereof into said branch passage.

8. In an internal combustion engine and in combination with an intake manifold passage divided into branches to supply the inlet valves for a plurality of cylinders, a deflector extending into the passage from a wall of the manifold at the junction of the main passage thereof with one of said branches and forming a take-off for particles of heavy fuel.

9. In an internal combustion engine and in combination with a curved intake manifold passage having branches leading therefrom to the inlet valves for a plurality of cylinders, a deflector extending from the inner curved wall of the passage partly across the mouth of one of said branches and forming a take-off for heavy particles of fuel.

10. In an internal combustion engine and in combination with an intake manifold passage divided into branches to supply the inlet valves for a plurality of cylinders, a deflector extending into the passage from an inner wall thereof and terminating in an edge which is substantially midway of the air stream leading to each of the inlet valves.

11. A horizontally disposed intake manifold for internal combustion engines, having a main passage, a branch passage, and an enlarged chamber at the junction of said passages, and a baffle in the lower part only of said chamber and extending part way only thereacross.

12. An intake manifold for internal combustion engines, comprising a main passage, branch passages leading therefrom to inlet valves, one of said branch passages being at an acute angle to the main passage, and means at the bottom of said main passage and located at the apex of said angle for deflecting the heavy unvaporized particles of fuel.

13. An intake manifold for internal combustion engines, comprising a main passage, branch passages leading therefrom to the inlet valves, and a baffle projecting partly across one of said branch passages at the bottom of the passage for deflecting the heavy unvaporized particles of fuel.

14. In an internal combustion engine, an intake manifold comprising a main passage having an inner curved wall terminating in a branch passage leading obliquely therefrom to an inlet valve, and a deflector projecting from the curved wall partly across said branch passage and extending in the direction of flow of the mixture, said deflector forming a take-off for heavy particles of fuel.

15. A charge supplying system for internal combustion engines including a conduit leading from the carbureter, a main intake manifold passage communicating with said conduit, branch passages leading from said main passage to inlet valves, a hot spot intermediate said branch passages, and baffles for directing the unvaporized portions of a charge passing through said main passage into proximity to said hot spot during their passage to either of said branch passages.

In testimony whereof we affix our signatures.

STEPHEN I. FEKETE.
STUART G. BAITS.